United States Patent
Cocquet et al.

(10) Patent No.: US 11,396,618 B2
(45) Date of Patent: Jul. 26, 2022

(54) ADHESIVE COMPOSITION BASED ON ETHYLENE COPOLYMERS OBTAINED BY TUBE COPOLYMERISATION, THAT CAN BE USED FOR EXTRUSION-COATING AND EXTRUSION-LAMINATION

(71) Applicant: SK GLOBAL CHEMICAL CO., LTD., Seoul (KR)

(72) Inventors: Clio Cocquet, Bernay (FR); Betty Laurent, Barc (FR); Claire Michalowicz, Evreux (FR); Mathieu Bodiguel, Lyons (FR); Alain Bouilloux, Saint-leger De Rotes (FR)

(73) Assignee: SK GLOBAL CHEMICAL CO., LTD., Seoul (KR)

( * ) Notice: Subject to any disclaimer, the term of this patent is extended or adjusted under 35 U.S.C. 154(b) by 241 days.

(21) Appl. No.: 15/573,267

(22) PCT Filed: May 11, 2016

(86) PCT No.: PCT/FR2016/051112
§ 371 (c)(1),
(2) Date: Nov. 10, 2017

(87) PCT Pub. No.: WO2016/181074
PCT Pub. Date: Nov. 17, 2016

(65) Prior Publication Data
US 2018/0134928 A1    May 17, 2018

(30) Foreign Application Priority Data

May 11, 2015   (FR) ..................................... 15 54183

(51) Int. Cl.
| | | |
|---|---|---|
| *C09J 123/08* | (2006.01) | |
| *B32B 7/12* | (2006.01) | |
| *C09J 7/22* | (2018.01) | |
| *B32B 27/32* | (2006.01) | |
| *C08F 210/02* | (2006.01) | |
| *B32B 27/08* | (2006.01) | |
| *C08L 23/08* | (2006.01) | |
| *B32B 27/10* | (2006.01) | |
| *B32B 27/30* | (2006.01) | |
| *B32B 27/36* | (2006.01) | |
| *B32B 15/20* | (2006.01) | |
| *B32B 23/08* | (2006.01) | |
| *B32B 29/00* | (2006.01) | |
| *B32B 27/38* | (2006.01) | |
| *B32B 15/08* | (2006.01) | |
| *B32B 27/34* | (2006.01) | |
| *C09J 7/35* | (2018.01) | |
| *C09J 7/30* | (2018.01) | |
| *B05D 5/10* | (2006.01) | |
| *B32B 37/12* | (2006.01) | |

(52) U.S. Cl.
CPC .......... *C09J 123/0869* (2013.01); *B05D 5/10* (2013.01); *B32B 7/12* (2013.01); *B32B 15/08* (2013.01); *B32B 15/20* (2013.01); *B32B 23/08* (2013.01); *B32B 27/08* (2013.01); *B32B 27/10* (2013.01); *B32B 27/304* (2013.01); *B32B 27/308* (2013.01); *B32B 27/32* (2013.01); *B32B 27/34* (2013.01); *B32B 27/36* (2013.01); *B32B 27/38* (2013.01); *B32B 29/002* (2013.01); *B32B 37/1284* (2013.01); *C08F 210/02* (2013.01); *C08L 23/0869* (2013.01); *C09J 7/22* (2018.01); *C09J 7/30* (2018.01); *C09J 7/35* (2018.01); *B32B 2255/10* (2013.01); *B32B 2255/205* (2013.01); *B32B 2255/26* (2013.01); *B32B 2270/00* (2013.01); *B32B 2307/4023* (2013.01); *B32B 2307/514* (2013.01); *B32B 2307/75* (2013.01); *B32B 2405/00* (2013.01); *C09J 2301/414* (2020.08); *C09J 2423/04* (2013.01); *C09J 2433/00* (2013.01); *C09J 2467/006* (2013.01)

(58) Field of Classification Search
None
See application file for complete search history.

(56) References Cited

U.S. PATENT DOCUMENTS

| 3,201,374 A | 8/1965 | Simms et al. |
|---|---|---|
| 4,644,044 A | 2/1987 | Gloriod et al. |
| 2002/0198323 A1 | 12/2002 | Morris |
| 2004/0001960 A1* | 1/2004 | Trouilhet ................ B32B 27/08 |
| | | 428/483 |

(Continued)

FOREIGN PATENT DOCUMENTS

| EP | 0 222 789 A1 | 5/1987 |
|---|---|---|
| EP | 0 444 865 A2 | 2/1991 |

(Continued)

OTHER PUBLICATIONS

"5400 Continuous Flow Tubular Reactors", Parr Instrument Company, Nov. 5, 2019. (Year: 2019).*

(Continued)

*Primary Examiner* — Anish P Desai
(74) *Attorney, Agent, or Firm* — Buchanan Ingersoll & Rooney P.C.

(57) ABSTRACT

An adhesive composition of at least one ethylene polymer or copolymer, wherein at least one first polymer or copolymer including the unsaturated carboxylic acid ester type comonomer is copolymerized in a continuous high-pressure tubular reactor, while a second polymer or copolymer including the functional comonomer is copolymerized by either autoclave or tubular continuous high-pressure radical means; the first and second polymer or copolymer possibly being of one and the same polymer/copolymer. Also, a multilayer structure that incorporates the adhesive composition and a particular process for obtaining this composition.

9 Claims, No Drawings

(56) References Cited

U.S. PATENT DOCUMENTS

2009/0297857 A1* 12/2009 Pascal .............. C09D 123/0869
428/421
2012/0021156 A1* 1/2012 Devisme ............... C08F 210/02
428/36.9

FOREIGN PATENT DOCUMENTS

| EP | 1 136 536 A1 | 9/2001 | |
|----|---|---|---|
| FR | 2 569 412 A1 | 2/1986 | |
| GB | 991568 A | 5/1965 | |
| WO | WO-03051630 A1 * | 6/2003 | ............. B32B 27/08 |
| WO | WO 2006/064117 A1 | 6/2006 | |

OTHER PUBLICATIONS

International Search Report (PCT/ISA/210) dated Sep. 7, 2016, by the French Patent Office as the International Searching Authority for International Application No. PCT/FR2016/051112.

Written Opinion (PCT/ISA/237) dated Sep. 7, 2016, by the French Patent Office as the International Searching Authority for International Application No. PCT/FR2016/051112.

* cited by examiner

ADHESIVE COMPOSITION BASED ON ETHYLENE COPOLYMERS OBTAINED BY TUBE COPOLYMERISATION, THAT CAN BE USED FOR EXTRUSION-COATING AND EXTRUSION-LAMINATION

The present invention relates to an adhesive composition or binder based on one or more ethylene polymers or copolymers, said composition being obtained at least in part by tubular polymerization, that can be used in an extrusion-coating process for application onto a support or in an extrusion-lamination process to bond together several supports that may be of the same or different nature.

It is known to use ethylene and (meth)acrylic acid copolymers as a binder for extrusion-coating onto an aluminum support; however, these copolymers only adhere to a limited number of supports, and in particular do not adhere to oriented plastic films such as polyester (OPET), polypropylene (OPP) or polyamide (OPA). Certain compositions from the prior art adhere to these various supports (good versatility) but then the level of adhesion degrades substantially so that the hermetic sealing required for a certain number of packagings is not obtained.

Document FR 98 13248 describes a binder of the ethylene/alkyl (meth)acrylate/glycidyl methacrylate (GMA) terpolymer type for bonding a polyester film such as corona-treated polyethylene terephthalate (PET) onto another substrate such as polyethylene (PE); however, the versatility for bonding onto other substrates is limited.

Document EP 444 865 describes binders of the sealable-peelable type for aluminum lids for plastic packaging, of which the compositions comprise, as a blend, ethylene and vinyl acetate (EVA) or ethylene/alkyl (meth) acrylate copolymers, with ethylene and unsaturated acid or its anhydride and unsaturated ester terpolymers. These binders which must be sealable and peelable are not used as binders for extrusion-coating and extrusion-lamination between an aluminum support and a thermoplastic support.

Document EP 1 136 536 describes a coextrusion binder comprising:
  5 to 35 parts of a polymer (A) itself consisting of a blend of 80 to 20 parts of a metallocene polyethylene (A1) and 20 to 80 parts of a non-metallocene LLDPE polyethylene (A2), the blend (A1)+(A2) being cografted by an unsaturated carboxylic acid,
  95 to 65 parts of a polyethylene (B) chosen from polyethylene homopolymers or copolymers and elastomers,
the blend of (A) and (B) being such that the content of grafted unsaturated carboxylic acid is between 30 and 100 000 ppm.

These compositions, which are very effective in coextrusion, are not very efficient in extrusion-coating and extrusion-lamination technologies, on certain supports such as oriented polyethylene terephthalate (OPET).

Document EP 222 789 describes a thermoplastic composition consisting of a blend of an ethylene-based polymer or copolymer and an ethylene/alkyl (meth)acrylate/maleic anhydride terpolymer; in the examples describing the use of this composition in coating an aluminum support, the terpolymer is used as a blend with 15 to 50% by weight of a radical polyethylene, which gives maleic anhydride contents between 1.4 and 2.5% by weight. This type of composition, due to its high maleic anhydride content, is very sensitive to moisture and, in addition, its adhesion properties to films made of OPET, OPA and OPP are mediocre.

Document US 2002/0198323 A1 describes a polymer blend used for high-speed coating of a polar substrate such as an aluminum foil, comprising low-density polyethylene (LDPE) (at least 55% by weight) and a copolymer having a low acid content which is an ethylene/(meth)acrylic acid copolymer, which may contain from 0 to 20% by weight of another ethylenically unsaturated comonomer. Preferably, this copolymer having a low acid content is an ethylene/(meth)acrylic acid/isobutyl acrylate terpolymer, having a content of the latter comonomer between 1% and 8% by weight of the terpolymer, namely at most 3.6% in the blend. This type of formulation only adheres to a limited number of supports such as aluminum, paper and polyethylene.

Document WO 2006/064117 describes an adhesive composition consisting of at least one ethylene polymer or copolymer, this composition comprising at least one unsaturated carboxylic acid ester type comonomer, and at least one functional comonomer, that can be used in an extrusion-coating process for application onto a support or in an extrusion-lamination process for bonding together several supports of the same or a different nature, characterized in that said composition has a content of unsaturated carboxylic acid ester type comonomer(s) of greater than 5% by weight and that the functional comonomer consists of a reactive function in the form of an acid, anhydride or epoxide group, the content of which is less than 1% by weight of the composition. These formulations have good versatility (a large number of supports can be used with this composition), however, the adhesion levels obtained are sometimes insufficient on certain types of supports and in particular on printed supports and the extrusion temperatures needed to achieve these adhesions are high.

There is not currently a composition for sealing, intended to be used in extrusion-coating and/or extrusion-lamination, which is both perfectly versatile (capable of adhering to all types of supports or virtually all supports) and which has an excellent level of adhesion (necessary for hermetic sealings).

The applicant has discovered, surprisingly, that it was possible to significantly improve the adhesion properties of an adhesive composition or binder, consisting of at least one ethylene polymer or copolymer combining both a low content of a reactive function, which is of acid, anhydride or epoxide type, in particular in an olefinic matrix, and a sufficient content of unsaturated carboxylic acid ester comonomers, applied to a support by an extrusion-coating process or for bonding together supports of a different and varied nature by an extrusion-lamination process, by polymerizing at least one or other of the components in a tubular reactor.

The advantages of such a composition are, besides the versatility of the adhesion irrespective of the type of supports, the possibility of use over a wide temperature range between 220 and 330° C. and at high processing speeds, the insensitivity to moisture uptake and also the reduced level of odor emitted, both during the use thereof and in the finished products, and also the obtaining of an excellent level of adhesion to the support, irrespective of the support considered.

The present invention relates to an adhesive composition consisting of at least one ethylene polymer or copolymer, this composition comprising at least one unsaturated carboxylic acid ester type comonomer, and at least one functional comonomer, in particular that can be used in an extrusion-coating process for application onto a support or in an extrusion-lamination process for bonding together several supports of the same or a different nature, over a wide temperature range, in particular between 220 and 330° C., said composition having an unsaturated carboxylic acid ester type comonomer content of greater than 5% by weight and that the functional comonomer consists of at least one reactive function in the form of an acid, anhydride or epoxide group, the content of which is less than 2% by weight of the composition, characterized in that at least one first polymer or copolymer comprising the unsaturated carboxylic acid ester type comonomer is copolymerized in a continuous high-pressure tubular reactor, while a second polymer or copolymer comprising the functional comonomer is copolymerized by either autoclave or tubular high-pressure radical means; the first and second aforesaid polymer or copolymer possibly consisting of one and the same polymer/copolymer.

The invention also relates to an adhesive composition comprising at least one first copolymer, which first copolymer comprises, or consists of:
  ethylene comonomers, in particular a majority of ethylene comonomers, and
  unsaturated carboxylic acid ester type comonomers, and optionally
  functional comonomers comprising at least one reactive function selected from the group consisting of an acid function, an anhydride function or an epoxide function,
said composition comprising at least 5% by weight of said unsaturated carboxylic acid ester type comonomers relative to the weight of said composition and, when the functional comonomers are present, less than 2% by weight of said functional comonomers relative to the weight of said composition,
and wherein the first copolymer is obtained by copolymerization in a continuous high-pressure tubular reactor.

Preferably, the composition according to the invention can be used in an extrusion-coating process for application onto a support or in an extrusion-lamination process for bonding together several supports of the same or a different nature, over a wide temperature range, in particular between 220 and 330° C.

As is understood here, the expression "ethylene polymer or copolymer" denotes a polymer or a copolymer based on ethylene monomers or comonomers, in particular based on a majority of ethylene monomers or comonomers. The term "majority" indicates that at least 50% by weight of the constituent monomers or comonomers of the polymer or copolymer relative to the weight of the composition are ethylene monomers or comonomers.

As is understood here, and unless otherwise indicated, the indications of the level, content or amount of polymerized or unpolymerized comonomers of the composition or of the polymer/copolymer expressed in % by weight are relative to the weight of the composition, independently of the number of copolymers present in the composition. The expression "% by weight" thus denotes a mass/mass ratio which may be expressed in "g/100 g".

Within the meaning of the present invention, "comonomer" or "monomer" are understood equally as the constituent subunits of a copolymer or of a polymer before and after polymerization.

The invention also relates to an adhesive composition as defined above comprising at least one second copolymer blended with the first copolymer, which second copolymer comprises, or consists of:
  ethylene comonomers, in particular a majority of ethylene comonomers, and
  unsaturated carboxylic acid ester type comonomers, and
  functional comonomers comprising at least one reactive function selected from the group consisting of an acid function, an anhydride function or an epoxide function.

The second copolymer may be obtained by either autoclave or tubular continuous high-pressure radical means.

The "second copolymer" is understood to mean a copolymer different from the first copolymer.

Preferably, when the composition according to the present invention comprises a second copolymer, the first copolymer does not comprise a functional comonomer comprising at least one reactive function selected from the group consisting of an acid function, an anhydride function or an epoxide function.

Preferably, when the composition according to the present invention comprises a second polymer or copolymer, the weight ratio between the first and second polymer or copolymer respectively is between 99:1 and 10:90, more preferably between 98:2 and 40:60.

In one particular embodiment of the invention, when the composition according to the present invention comprises a second polymer as defined above, then the first copolymer comprises functional comonomers.

Preferably, the first copolymer and optionally the second copolymer are blended by extrusion.

As a person skilled in the art will understand, the composition according to the invention may in particular be a resin.

It is understood here that the applicant conducted a large number of experiments in order to determine the lower limit of the unsaturated carboxylic acid ester type comonomer that has to be present in the composition, namely 5%, and also the preferred ranges presented below. Thus in particular, below the lower limit defined above, the adhesion of the composition drops very significantly.

Similarly, the applicant observed after various experiments that above 2% by weight of the composition of functional comonomer, more specifically of the reactive function of the latter, no gain in adhesion or in versatility was obtained (without for that matter a degradation in the physicochemical properties or the processability being noted) so that it is not advisable to use a greater amount of reactive function, in particular for economic reasons.

Other features or preferred embodiments according to the invention are presented below:
  according to one possibility offered by the invention, the aforesaid first and second polymers or copolymers are obtained by copolymerization of their monomers in a continuous high-pressure tubular reactor. In this case, the first and second polymers may either consist of one and the same polymer/copolymer or consist of two different polymers/copolymers;
  preferably, the content of reactive function(s) is between 0.05% and 0.9% by weight relative to said composition;
  preferably, said composition comprises less than 1% by weight of functional comonomers relative to the weight of said composition;
  preferably also, said composition comprises from 0.05% to 0.9% by weight of functional comonomers relative to the weight of said composition;
  preferably, the carboxylic acid ester type comonomer is selected from alkyl (meth)acrylates, the alkyl group comprising from 1 to 24 carbon atoms;
  preferably, the unsaturated carboxylic acid ester type comonomer is selected from the group consisting of: alkyl acrylates and alkyl methacrylates, the alkyl group comprising from 1 to 24 carbon atoms;
  advantageously, the functional comonomer is selected from unsaturated carboxylic acid anhydrides, and in particular is maleic anhydride;

preferably, the content of maleic anhydride is between 0.15% and 0.6% by weight of the composition;

advantageously, the content of alkyl (meth)acrylate type comonomer is between 10% and 40% by weight of the composition;

preferably, the content of alkyl (meth)acrylate type comonomer is between 15% and 25% by weight of the composition;

preferably, the composition comprises or consists of 15% to 25% by weight of unsaturated carboxylic acid ester type comonomers relative to the weight of said composition;

preferably, the reactive function is present at a content of less than 1% by weight of the composition;

preferably, the first copolymer has at least 5%, preferably between 10% and 40%, and more preferably between 15% and 25% by weight of said unsaturated carboxylic acid ester type comonomers relative to the total weight of said first copolymer;

preferably, the second copolymer comprises at least 5%, preferably between 10% and 40%, and more preferably between 15% and 25% by weight of said unsaturated carboxylic acid ester type comonomers relative to the total weight of said second copolymer;

preferably, the copolymer having functional comonomers comprising at least one reactive function selected from the group consisting of an acid function, an anhydride function or an epoxide function, relative to the total weight of said first copolymer, whether it is the first or second copolymer, comprises between 0.5% and 10%, and more preferably between 1% and 6% by weight of said functional comonomers;

preferably, when the composition according to the invention comprises a first copolymer and a second copolymer, these comprise equivalent proportions by weight of ethylene comonomers relative to the weight of the composition;

preferably, when the composition according to the invention comprises a first copolymer and a second copolymer, these comprise equivalent proportions by weight of unsaturated carboxylic acid ester type comonomers relative to the weight of the composition.

Preferably, the expression "equivalent proportions by weight" is understood to mean differences of less than 20%, preferably of less than 10% by weight relative to the weight of the composition.

The polymerization of copolymerization of monomers in a continuous high-pressure tubular reactor results in a polymer or copolymer having particular physicochemical properties, which are different depending on the nature of the monomers considered, so that the definition of a component by this method of obtention best defines the latter, without it being necessary and even possible to define this component with the aid of another feature or property.

The technique of tubular polymerization or copolymerization is well known to a person skilled in the art. By way of indication and nonlimitingly, document EP 1453674 describes a copolymerization in a continuous tubular reactor that may be used to obtain a copolymer from functional comonomers and/or unsaturated carboxylic acid ester type comonomers.

In the same way, the definition of a high-pressure radical polymerization relative to a polymer or a copolymer defines its nature, its characteristics and/or physicochemical properties.

Preferably, the copolymerization in the continuous high-pressure tubular reactor is carried out at a temperature between 190° C. and 260° C., preferably between 200° C. and 250° C., and more preferably between 210° C. and 240° C.

Preferably, the copolymerization in a continuous high-pressure tubular reactor is carried out at a pressure between 1500 and 3000 bar, preferably between 1700 and 2800 bar, and more preferably between 2000 and 2500 bar.

The ethylene copolymer(s) of the composition according to the invention, in particular the first or the second copolymer, may be diluted in a polyethylene homopolymer or copolymer such as in particular low-density polyethylene, linear low-density polyethylene, ultra low-density polyethylene or metallocene polyethylene, which results in a decrease in the adhesive characteristics of the compositions thus obtained; however, these adhesive characteristics remain sufficient for the coating or lamination onto certain envisaged supports.

Preferably, the adhesive composition is characterized in that the functional comonomer is selected from acid, anhydride or epoxide groups.

Preferably, the functional group is selected from compounds of carboxylic acids or of the unsaturated carboxylic acid anhydride derivatives thereof.

Examples of unsaturated dicarboxylic acid anhydrides are in particular maleic anhydride, itaconic anhydride, citraconic anhydride, and tetrahydrophthalic anhydride. Preferably, it is maleic anhydride that is used.

However, the functional comonomer may comprise an unsaturated epoxide type function.

Examples of unsaturated epoxides are in particular:

aliphatic glycidyl esters and ethers, such as allyl glycidyl ether, vinyl glycidyl ether, glycidyl maleate and itaconate, acrylate and glycidyl methacrylate (GMA); and alicyclic glycidyl esters and ethers, such as glycidyl 1-cyclohex-2-ene ether, diglycidyl 4,5-cyclohexene dicarboxylate, glycidyl 4-cyclohexene carboxylate, glycidyl 5-norbornene-2-methyl-2-carboxylate and diglycidyl endocis-bicyclo(2.2.1)hept-5-ene-2,3-dicarboxylate.

Unsaturated monocarboxylic or dicarboxylic acid type functions, such as (meth)acrylic acid may also be used.

Preferably, the functional comonomer is selected from unsaturated carboxylic acid anhydrides, and preferably is maleic anhydride.

The invention also relates to the use of an adhesive composition as defined above, for the preparation of a multilayer structure, said multilayer structure preferably comprising at least one layer of a support.

The invention also relates to a multilayer structure comprising:

at least one layer of an adhesive composition as defined above, and at least one layer of a support.

Preferably, the multilayer structure according to the invention comprises a plurality of alternations of a layer of adhesive composition as defined above and of a support layer.

Preferably, the support as defined above is selected from the group consisting of aluminum, paper, board, cellophane, films based on polyethylene, polypropylene, polyamide, polyester, polyvinyl chloride (PVC), polyvinylidene chloride (PVDC) and polyacrylonitrile (PAN) resins, these films being optionally oriented, optionally metalized, optionally printed, optionally treated by physical or chemical means, and films coated with a thin inorganic barrier layer, such as polyester (PET SiOx or AlOx).

According to another embodiment, the invention relates to a multilayer structure obtained by use of the abovementioned adhesive composition, in an extrusion-coating process for application onto a support, characterized in that said support is selected from aluminum, paper or board, cellophane, films based on polyethylene, polypropylene, polyamide, polyester, polyvinyl chloride (PVC), polyvinylidene chloride (PVDC) or polyacrylonitrile (PAN) resins, these films being optionally oriented, optionally metalized, optionally printed, optionally treated by physical or chemical means, and films coated with a thin inorganic barrier layer, such as polyester (PET SiOx or AlOx).

According to another embodiment, the invention relates to a multilayer structure obtained by use of the abovementioned adhesive composition, in an extrusion-lamination process for bonding together several supports of the same or a different nature, characterized in that these supports are selected from aluminum, paper or board, cellophane, films based on polyethylene, polypropylene, polyamide, polyester, polyvinyl chloride (PVC), polyvinylidene chloride (PVDC) or polyacrylonitrile (PAN) resins, these films being optionally oriented, optionally metalized, optionally printed, optionally treated by physical or chemical means, and films coated with a thin inorganic barrier layer, such as polyester (PET SiOx or AlOx).

The invention also relates to a process for preparing an adhesive composition, comprising a step a) of copolymerization in a continuous high-pressure tubular reactor of:
ethylene comonomers, and
unsaturated carboxylic acid ester type comonomers, and optionally
functional comonomers comprising at least one reactive function selected from the group consisting of an acid function, an anhydride function or an epoxide function.

According to one particular embodiment said process additionally comprises a step b) of copolymerization of a second copolymer, preferably by either autoclave or tubular continuous high-pressure radical means, of:
ethylene comonomers, and
unsaturated carboxylic acid ester type comonomers, and functional comonomers, said functional comonomers comprising at least one reactive function selected from the group consisting of an acid function, an anhydride function or an epoxide function.

Preferably, said composition comprises at least 5% by weight of said unsaturated carboxylic acid ester type comonomers relative to the weight of said composition and, when the functional comonomers are present, less than 2% by weight of the functional comonomers relative to the weight of said composition.

Preferably, all of the comonomers comprise at least 5% by weight of unsaturated carboxylic acid ester type comonomers relative to the total weight of comonomers and, when the functional comonomers are present, less than 2% by weight of the functional comonomers relative to the total weight of said monomers.

The expression "all of the comonomers" is understood to mean, when the process does not comprise step b), the ethylene comonomers, the unsaturated carboxylic acid ester type comonomers, and optionally the functional comonomers, present in the copolymerization step a), and when the process does comprise a step b), the ethylene comonomers, the unsaturated carboxylic acid ester type comonomers, and optionally the functional comonomers present in step a) and step b).

Thus, preferably, in the process according to the invention, at least 5% by weight of unsaturated carboxylic acid ester type comonomers relative to the total weight of comonomers and/or, when the functional comonomers are present, less than 2% by weight of the functional comonomers relative to the total weight of said monomers are polymerized, that is to say are subjected to step a) and optionally b).

Preferably, the step of copolymerization in the continuous high-pressure tubular reactor is carried out at a temperature between 190° C. and 260° C., preferably between 200° C. and 250° C., and more preferably between 210° C. and 240° C.

Preferably, the step of copolymerization in a continuous high-pressure tubular reactor is carried out at a pressure between 1500 and 3000 bar, preferably between 1700 and 2800 bar, and more preferably between 2000 and 2500 bar.

Preferably, the step of autoclave continuous high-pressure copolymerization is carried out at a temperature between 170° C. and 240° C., preferably between 180° C. and 230° C., and more preferably between 190° C. and 220° C.

Preferably, the step of copolymerization in a continuous high-pressure tubular reactor is carried out at a pressure between 1000 and 2600 bar, preferably between 1300 and 2300 bar, and more preferably between 1600 and 2000 bar.

In the case where said composition comprises at least two copolymers, the composition comprises at least 5% by weight of the unsaturated carboxylic acid ester type comonomer relative to the weight of said composition and less than 2% by weight of the functional comonomer relative to the weight of said composition, these proportions taking into account the first and second copolymers. Furthermore, the weight ratio between the first and second polymer or copolymer is preferably comprised between 99:1 and 10:90, more preferably between 98:2 and 40:60.

Preferably, the process according to the present invention additionally comprises a step of blending said first copolymer and optionally said second copolymer by extrusion.

Moreover, the invention also relates to a process for obtaining the abovementioned adhesive composition, characterized in that it consists of the continuous high-pressure tubular radical polymerization, in a single step, of all the comonomers.

The invention also relates to an adhesive composition capable of being obtained by the implementation of the preparation process as defined above.

The adhesive composition of the invention may additionally contain other additives, such as antiblocking agents, slip agents, antioxidants, fillers, pigments, dyes and processing aids to facilitate the use of this composition in extrusion-coating or extrusion-lamination. Some of these additives may be introduced into the composition in the form of masterbatches.

More specifically, each of the layers of the multilayer structure according to the invention may comprise the customary additives including plasticizers, stabilizers, antioxidants, ultraviolet radiation absorbers, hydrolytic stabilizers, antistatic agents, dyes or pigments, fillers, flame retardants, lubricants, slip agents, antiblocking agents, reinforcing agents such as fibreglass and flakes, processing aids, for example mold release agents, and/or mixtures thereof.

The multilayer structure according to the invention may be prepared by extrusion coating (extrusion-coating or extrusion-lamination), coextrusion with the other layers, on a first layer. In another embodiment of the invention, the laminate may be prepared by the coextrusion of a first layer and of a second layer and optionally of supplementary layers. It is preferably prepared by extrusion coating.

The extrusion coating process is well known to a person skilled in the art, nevertheless by way of nonlimiting example, a presentation of this technique is given below.

The extrusion coating process makes it possible to coat a substrate with polymer layers in a molten state. The polymers in the form of pellets are transported into the hopper of the extruders. The extruders melt the polymer and develop a certain pressure to force it through a die. The molten mass of the various polymers is melted in the feed block or directly in the slot die. The lines for producing coating by coextrusion customarily have two or three extruders that provide the molten masses of polymer to the same die. The molten flow leaving the die is drawn by two rolls that form the nip: a chill roll and a rubber-coated roll. The total thickness of the polymers in the nip is typically between 15 microns and 50 microns. The polymer is pressed onto the substrate in the nip to develop the adhesion, cooled by the chill roll and solidified. The substrate that is unwound from a roll may be flame treated, treated by a Corona process or finished before entering the nip where it is coated by the flow of molten mass. The typical speeds of the lines lie between 100 and 300 m/min (meters per minute).

EXAMPLES OF IMPLEMENTATION

The structures are produced by extrusion coating or lamination on a COLLIN laboratory line.

The adhesion of the binders is evaluated during a peel test at 200 mm/min (millimeters per minute) on a Synergie 200H tensile testing machine equipped with a 100 N (Newton) load cell.

Ink 1=White
Ink 2=Red 1
Ink 3=Green 1
Ink 4=Blue
Ink 5=Red 2 (different type to ink 2)
Ink 6=Green 2 (different type to ink 3)

Binders or resins of different compositions (the overall characteristics of which are specified in the table below) were used in the various examples.

| Reference | Nature of the binder | Acrylate (% by weight of the composition) | MAH (maleic anhydride, % by weight of the composition) | MFI |
|---|---|---|---|---|
| Resin 1 | Autoclave EMA | 24 | 0 | 7 |
| Resin 2 | Tubular EMA | 24 | 0 | 5.4 |
| Resin 3 | Autoclave terpolymer | 20 | 0.3 | 8 |
| Resin 4 | Tubular terpolymer | 25 | 0.3 | 7.3 |
| Resin 5 | Mixture (SA) | 23 | 0.3 | 6 |
| Resin 6 | Mixture (AA) | 23 | 0.3 | 6 |

The MFI (Melt Flow Index) was measured using a dead-weight extrusion plastometer according to the ISO 1133 standard, at a temperature of 190° C. and under a weight of 2.16 kg. The result is expressed in grams/10 minutes.

Resins 1 and 2 (EMA) are ethylene/methyl acrylate copolymers obtained by continuous high-pressure radical copolymerization, respectively according to an autoclave process at a temperature of 205° C. and a pressure of 1690 bar (1) and a tubular process (2) at a temperature of 230° C. and a pressure of 2500 bar.

Resin 3 is an ethylene/methyl acrylate/maleic anhydride terpolymer obtained by (continuous) high-pressure radical copolymerization according to an autoclave process at a temperature of 205° C. and a pressure of 1690 bar.

Resin 4 is an ethylene, methyl acrylate and maleic anhydride terpolymer obtained by (continuous) high-pressure radical copolymerization according to a tubular process at a temperature of 205° C. and a pressure of 2200 bar.

Resins 5 and 6 are obtained by blending, on an extruder, an ethylene and methyl acrylate copolymer obtained by (continuous) high-pressure radical polymerization according to a tubular process at a temperature of 230° C. and a pressure of 2500 bar and an ethylene, methyl acrylate and maleic anhydride terpolymer obtained by autoclave high-pressure radical polymerization (at a temperature of 205° C. and a pressure of 1690 bar).

Resin 6 (denoted AA), unlike resin 5 (denoted SA) additionally comprises a mixture of additives for the processability (preventing bonding to the "chill roll").

Resins 4, 5 and 6 are resins according to the invention.

In the following, the "binder" denotes the composition tested, mainly in adhesion.

Example 1

This example shows that on a metalized support, the maleic anhydride of the terpolymer is essential for obtaining adhesion and that the tubular terpolymer performs better than the autoclave (high-pressure) terpolymer.

Structure=VmPET/binder/LDPE (12 μm/10 μm/30 μm)
LDPE: low-density polyethylene
VmPET: vacuum metalized PET film
EMA: ethylene methacrylate

| Binder | VmPET/binder/LDPE at 290° C. Peel force (N/15 mm) after 8 days |
|---|---|
| Resin 1 | <0.5 |
| Resin 2 | <0.5 |
| Resin 3 | 1.5 |
| Resin 4 | 1.5 |
| Resin 5 | 2.5 |

Example 2

This example shows the improvement in the adhesion obtained on the ink 1 by using a tubular EMA/autoclave EMA (comparison of tubular EMA relative to an autoclave EMA) and also by using a terpolymer/EMA and more remarkably by using a terpolymer derived from a tubular high-pressure (HP) polymerization/other binders.

Structure=OPET/ink/binder/LDPE (12 μm/1 μm/10 μm/30 μm)

| Binder | OPET/ink 1/binder/LDPE at 295° C. Peel force (N/15 mm) after 30 days |
|---|---|
| Resin 1 | 1.6 |
| Resin 2 | 2.5 |
| Resin 3 | 2.5 |
| Resin 4 | 3.1 |
| Resin 5 | 3.1 |

Example 3

This example shows the improvement in the adhesion obtained on OPET by using a terpolymer/tubular EMA and more remarkably by using a terpolymer from a tubular HP polymerization/other binders.

Structure=OPET/binder/LDPE (12 µm/10 µm/30 µm)

| Binder | OPET/binder/LDPE at 290° C. Peel force (N/15 mm) | |
|---|---|---|
| | $t_0$ | $t_0$ + 8 d (days) |
| Resin 2 | 3.2 | 3.9 |
| Resin 3 | 2.2 | 4.6 |
| Resin 6 | 3.9 | 6 |

Example 4

This example shows the improvement in the adhesion obtained on the inks 2 & 3 by using a terpolymer/tubular EMA and more remarkably by using a terpolymer from a tubular HP polymerization/other binders.

Structure=OPET/ink/binder/LDPE (12 µm/1 µm/10 µm/30 µm)

| Binder | OPET/ink 2/binder/ LDPE 290° C. | | OPET/ink 3/binder/ LDPE 290° C. | |
|---|---|---|---|---|
| | $t_0$ | $t_0$ + 8 d | $t_0$ | $t_0$ + 8 d |
| Resin 2 | 2.3 | 1.7 | 2.8 | 2 |
| Resin 3 | 1.5 | 2.7 | 1.7 | 2.6 |
| Resin 5 | 3.4 | 3.7 | 3.1 | 3.3 |

Example 5

This example again shows the advantage of a tubular terpolymer relative to an EMA for the adhesion to ink but this time with a BOPP (Biaxially Oriented PolyPropylene) support.

Structure=BOPP/ink/binder/LDPE (20 µm/1 µm/10 µm/50 µm)

| Binder | BOPP/ink 4/binder/LDPE at 290° C. Peel force (N/15 mm) | |
|---|---|---|
| | $t_0$ | $t_0$ + 8 d |
| Resin 2 | 2.9 | 2 |
| Resin 6 | 3.4 | 2.7 |

Example 6

This example demonstrates the improvement in the adhesion and the ultra-versatility of the formulation according to the invention. Specifically, it makes it possible to combine, in extrusion-lamination, various substrates of very different natures that EMAs do not permit. It also makes it possible to obtain higher peel forces on ink than the conventional version of the terpolymer obtained with an autoclave process.

Structures:
1: OPET/binder/Alu (12 µm/20 µm/37 µm)
2: OPET/binder/VmPET (12 µm/20 µm/12 µm)
3: BOPP/ink 5/binder/vmPET (20 µm/1 µm/20 µm/12 µm)

| binder | OPET/ binder/ Alu 12/20/37 µm at 310° C. Peel force (N/15 mm) (failure at the binder/alu interface) | | OPET/ binder/ vmPET 12/20/12 µm at 310° C. Peel force (N/15 mm) (failure at the binder/ vmPET interface) | | BOPP/ink 5/ binder/vmPET 20/20/12 µm at 310° C. Peel force (N/15 mm) | |
|---|---|---|---|---|---|---|
| | $t_0$ | $t_0$ + 8 d | $t_0$ | $t_0$ + 8 d | $t_0$ | $t_0$ + 8 d |
| Resin 3 | 7.9 | 9.2 | 6 | 9 | 0.3 (ink// binder) | 0.4 (ink// binder) |
| Resin 6 | 6 | 5.7 | 5 | 6.6 | uninitiatable since force too high | |
| Resin 1 or 2 | 0.7 | 0.5 | 0.4 | 0.3 | 0.5 (binder/ VmPET) | 0.6 (binder/ VmPET) |

Example 7

This example shows the improvement in the adhesion obtained with our new formulation relative to that obtained with the conventional formulation at "low" temperature.
Structure:
PP woven fabric/PP+LDPE/binder/ink 6/BOPP (100 µm/15 µm/1 µm/5 µm/20 µm)

| | PP woven fabric/PP + LDPE/binder/ink 6/BOPP (100/15/5/20 µm) | | | | | |
|---|---|---|---|---|---|---|
| | 290° C. | | | 320° C. | | |
| Binder | t0 | t > 30 days | interface | t0 | t > 30 days | interface |
| Resin 3 | 1.6 | 2 | Binder//ink | 3.5 | 3 | PP woven fabric// PP + LDPE |
| Resin 6 | 2.1 | 4.9 | PP woven fabric// PP + LDPE | 3.5 | 3.2 | PP woven fabric// PP + LDPE |

The invention claimed is:
1. An adhesive composition comprising at least one first copolymer, wherein the first copolymer comprises:
    ethylene comonomers and
    unsaturated carboxylic acid ester comonomers comprising methyl acrylates,
    and comprising at least one second copolymer blended with the first copolymer, wherein the second copolymer comprises:
    ethylene comonomers,
    unsaturated carboxylic acid ester comonomers comprising methyl acrylates, and
    functional comonomers comprising an anhydride function and optionally at least one reactive function selected from the group consisting of an acid function and an epoxide function, wherein said composition comprising at least 5% by weight of said unsaturated carboxylic acid ester comonomers relative to the weight of said composition and less than 2% by weight of the functional comonomers relative to the weight of said composition, wherein the first copolymer is obtained by copolymerization carried out at a temperature between 210° C. and 240° C. in a continuous high-pressure tubular reactor and the second copolymer is obtained by copolymerization carried out at a temperature between 190° C. and 220° C. in a continuous high-pressure autoclave reactor, wherein the weight ratio between the first copolymer and the second copolymer is between 98:2 and 40:60, wherein the composition can adhere onto a printed support by an extrusion-coating process, and wherein the printed support is selected from a printed polyethylene, polypropylene, polyamide, polyester, polyvinyl chloride (PVC), polyvinylidene chloride (PVDC) or polyacrylonitrile (PAN) film.

2. The adhesive composition as claimed in claim 1, comprising less than 1% by weight of the functional comonomers relative to the weight of said composition.

3. The adhesive composition as claimed in claim 1, wherein the unsaturated carboxylic acid ester comonomers further comprise: alkyl methacrylates, the alkyl group comprising from 1 to 24 carbon atoms.

4. The adhesive composition as claimed in claim 1, wherein the functional comonomers are maleic anhydride.

5. The adhesive composition as claimed in claim 1, comprising from 0.15% to 0.6% by weight of the functional comonomers relative to the weight of said composition.

6. The adhesive composition as claimed in claim 1, comprising from 10% to 40% by weight of the unsaturated carboxylic acid ester comonomers relative to the weight of said composition, said unsaturated carboxylic acid ester comonomers further comprising: alkyl methacrylates, the alkyl group comprising from 1 to 24 carbon atoms.

7. A method preparing a multilayer structure with the adhesive composition as defined in claim 1, the method comprising forming said multilayer structure with the adhesive composition, said multilayer structure comprising at least one layer of a support, said support being selected from the group consisting of aluminum, paper, board, cellophane, or films, wherein the films are based on polyethylene, polypropylene, polyamide, polyester, polyvinyl chloride (PVC), polyvinylidene chloride (PVDC) and polyacrylonitrile (PAN) resins, the films optionally being oriented, metalized, printed, or treated by physical or chemical means, and wherein the films are also coated with an inorganic barrier layer comprising SiOx or AlOx.

8. A multilayer structure comprising:
at least one layer of an adhesive composition as defined in claim 1, and
at least one layer of a support, said support being selected from the group consisting of aluminum, paper, board, cellophane, and films, wherein the films are based on polyethylene, polypropylene, polyamide, polyester, polyvinyl chloride (PVC), polyvinylidene chloride (PVDC) or polyacrylonitrile (PAN) resins, the films optionally being oriented, metalized, printed, or treated by physical or chemical means, wherein the films are coated with an inorganic barrier layer comprising SiOx or AlOx.

9. The adhesive composition as claimed in claim 1, comprising from 15% to 25% by weight of the unsaturated carboxylic acid ester comonomers relative to the weight of said composition, said unsaturated carboxylic acid ester comonomers further comprising: alkyl methacrylates, the alkyl group comprising from 1 to 24 carbon atoms.

* * * * *